G. F. SAWYER.
BOTTOM FOR COAL HOD.

No. 181,013.  Patented Aug. 15, 1876.

Witnesses:
Q. D. Tytler
C. C. Carpenter

Inventor:
George F. Sawyer,
Pr G. M. Hopkins.
atty.

UNITED STATES PATENT OFFICE

GEORGE F. SAWYER, OF ALBION, NEW YORK.

IMPROVEMENT IN BOTTOMS FOR COAL-HODS.

Specification forming part of Letters Patent No. 181,013, dated August 15, 1876; application filed December 31, 1875.

*To all whom it may concern:*

Be it known that I, GEORGE F. SAWYER, of Albion, in the county of Orleans and State of New York, have invented certain Improvements in Bottoms for Coal-Hods and other articles, of which the following is a specification:

My invention relates to a peculiar mode of fastening bottoms onto coal-hods and other articles; and consists in an inverted basin-shaped bottom, (which may be stamped up from one piece of metal, or it may be made from several pieces, forming the rim and bottom, or it may be made in cast or malleable iron,) having several apertures in the rim, through which projecting portions of the body of the hod are locked to securely fasten the bottom and body together.

Figure 1:
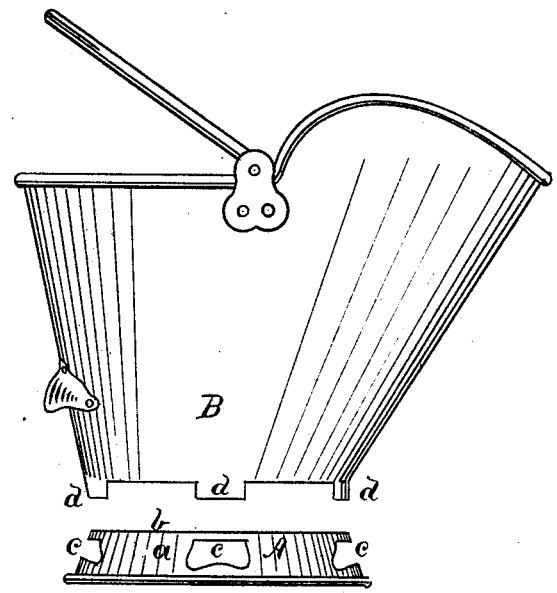
Figure 2:
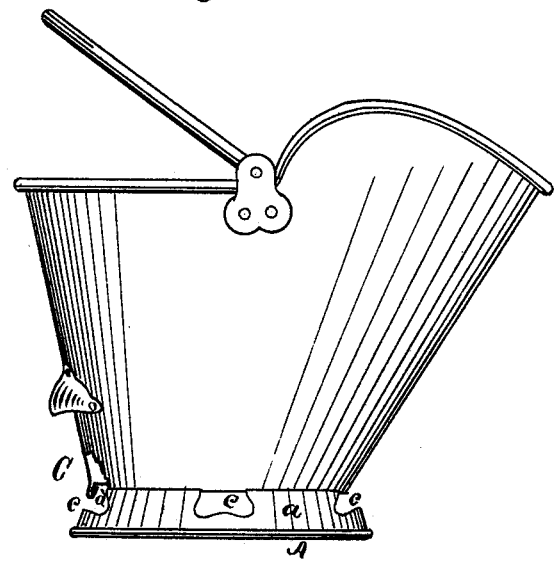

In the drawing, Figure 1 represents the bottom and body of the hod before putting together. Fig. 2 represents the hod complete, with a section cut away to show the manner of locking the bottom in.

A is a bottom, consisting of the rim $a$ and bottom $b$. $c\ c\ c$ are apertures made through the rim $a$, the upper sides of which are a small distance from, and parallel to, the bottom $b$. B is the body of the hod, having the lips or projections $d\ d\ d$ of the proper size and shape to lock into the bottom, as shown at C in Fig. 2.

The advantages claimed for this bottom are its cheapness, its strength, and the further advantage of having a circulation of air under the bottom through the apertures $c\ c\ c$. This is necessary, when the hod is used for conveying ashes or hot coals, to prevent burning the floor.

I claim as my invention—

The combination of the bottom A, apertures $c\ c\ c$, lips $d\ d\ d$, and body B.

GEORGE F. SAWYER.

Witnesses:
GEO. M. HOPKINS,
H. M. HOPKINS.